2 Sheets—Sheet 1.

G. MARTIN.
Brick-Machine.

No. 211,304. Patented Jan. 14, 1879.

Attest:
Wm P Lynde
Wm Hillonis

Inventor
Gaylord Martin

G. MARTIN.
Brick-Machine.
No. 211,304. Patented Jan. 14, 1879.
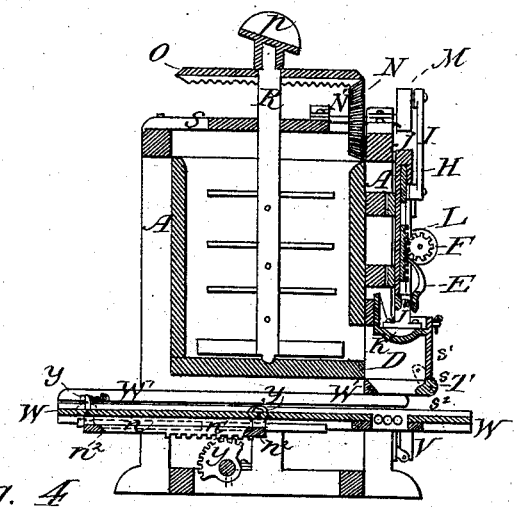
Fig. 3.
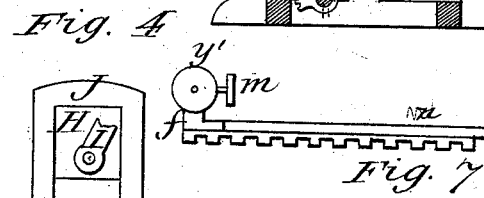
Fig. 4.
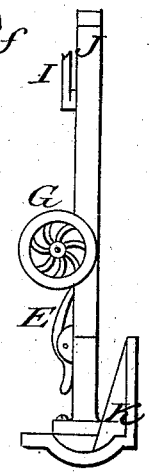
Fig. 5.
Fig. 7.
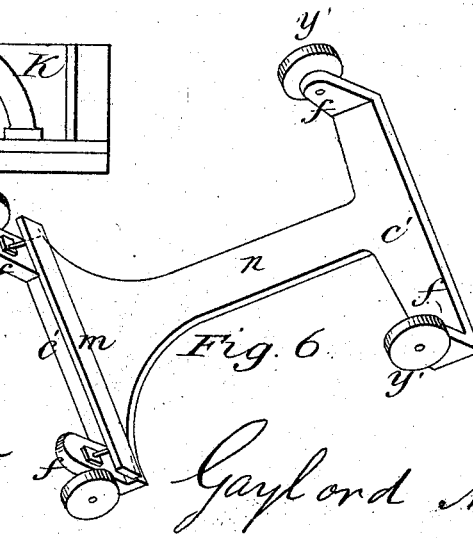
Fig. 6.
Attest:
Wm P Lynde
H C Bradley
Inventor
Gaylord Martin

UNITED STATES PATENT OFFICE.

GAYLORD MARTIN, OF MILWAUKEE, WISCONSIN.

IMPROVEMENT IN BRICK-MACHINES.

Specification forming part of Letters Patent No. 211,304, dated January 14, 1879; application filed October 14, 1878.

*To all whom it may concern:*

Be it known that I, GAYLORD MARTIN, of the city and county of Milwaukee, State of Wisconsin, have invented a new and useful Improvement in Brick-Machines, which improvement is fully set forth in the following specification and accompanying drawings, in which—

Figure 1:
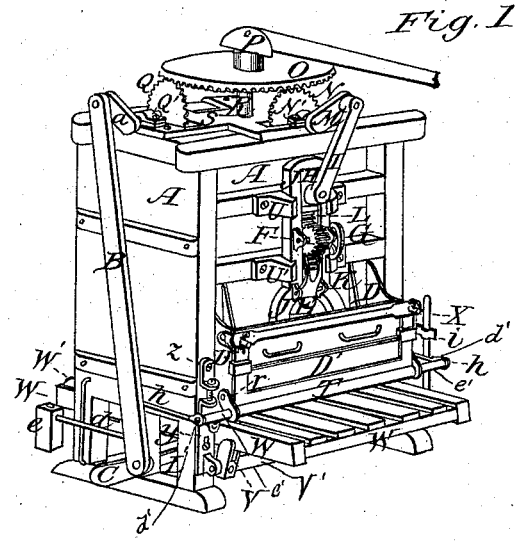
Figure 2:
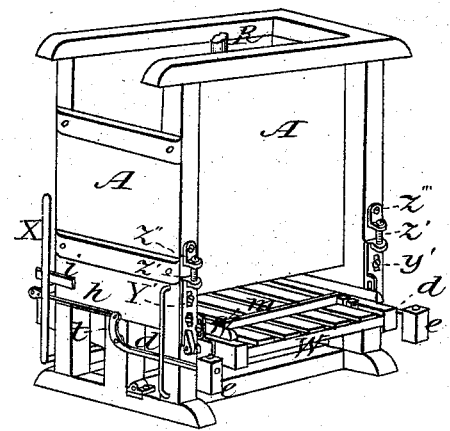

Figure 1 is a perspective view of the front and right side of the machine. Fig. 2 is a perspective view of the rear and left side of the machine. Fig. 3 is a sectional view. Fig. 4 is a view of the front of the movable frame attached to the plunger. Fig. 5 is a side view of the movable frame attached to the plunger. Fig. 6 is a perspective view of the mold-shover $n$. Fig. 7 is a side view or elevation of the mold-shover $n$.

Similar letters of reference in each figure indicate corresponding parts.

A indicates the frame and pug-mill. P is the lever-holder. O is the bevel-wheel attached to the center shaft, R, and which meshes with the pinions N and Q at the ends of the shafts N' and Q'; R, the center shaft, with radiating tempering-knives; S, a plate secured to the frame A, and which serves as a support to the center shaft, R, and to the bearings of the shafts N' and Q'; N, a pinion, which meshes with the bevel-wheel O and operates the shaft N'; N', a shaft, with the pinion N at one end and the crank M at the other. Q is a pinion, which meshes with the bevel-wheel O and operates the shaft Q'. Q' is a shaft, with the pinion Q at one end and the crank $a$ at the other. $a$ is a crank, which operates the pitman B. B is a pitman, connecting crank $a$ and crank C, and, when operated by crank $a$, produces an oscillating motion of the crank C. C is a crank secured to the shaft L', and operated by the pitman B; L', shaft to which crank C and the segment-rack $y$ are secured; $y$, a segment-rack, meshing with a rack on and operating the mold-shover $n$; $n$, mold-shover, operated by the segment-rack $y$, and which runs on tracks secured to the adjustable platform W; $y'$, friction-rollers, secured to the mold-shover $n$; $m$, cross-bar of mold-shover; W, adjustable platform, secured to the frame A so as to be raised or lowered as occasion requires; W', guides to keep the molds in proper position; Y, adjustable supports of the platform W, secured to the frame A by bolts or otherwise. These bolts, when not pressing upon the supports Y, allow them to be raised or lowered by the screws Z'. Z, elbow-flanges, firmly secured to the frame A, and which support the screws Z'; Z' screws, supported by the elbow-flanges Z, and by means of which the adjustable supports Y are raised or lowered; M, crank at the end of the shaft N', which operates the connecting-link I; I, connecting-link, connecting the crank M and the slide H; J, movable frame attached to the plunger K, and guided by the guides U and U'; U and U', guides secured to the frame A, and which guide the movable frame J; H, slide, operated by the pitman I, and which slides in grooves in the sides of the frame J; L, adjustable slide, which works in the movable frame J, and is raised or lowered by turning the spur-wheel F; F, spur-wheel, which meshes with the rack on the slide L; F', shaft, whose bearings are firmly secured to the frame J, to which shaft the spur-wheel F and the hand-wheel G are secured; E, dog, which has bearings firmly secured to the frame J, and, by means of a spring, is made to fall into the recesses between the teeth of the ratchets on the adjustable slide L; K, plunger, operated by the movable frame J, and which works in the press-box D; D, press-box; D', press-box door; T, stone door of press-box; $r$, hangers, which operate as hinges of the stone door T; $t$, lever, connected with the stone door T by the link $h$; $h$, link connecting the lever $t$ with the stone door T; $d$, arm of the lever $t$; $e$, adjustable weights, which regulate the pressure necessary to open the stone door T, and which, by means of the lever $t$ and connecting-link $h$, close the stone door T when opened; V, lowering-arms, secured to the shaft V', and upon which the platform W rests in front; X, lowering-lever, secured to the shaft V'; V', prime shaft, connecting the lowering-arms V and the lowering-lever X; $n^2$, tracks secured to the platform W, and upon which the mold-shover $n$ runs; $i$, latch which holds the lowering-lever X in position. $f$ indicates the lugs at the ends of the cross-heads $c'$ of the double T-shaped mold-shover $n$; $c'$, cross-heads of the double T-shaped mold-shover $n$; $e'$, the rods extending from the stone door T; $d'$, lugs at the ends of the rods $e'$; $s^1$, the outer surface of the stone door T; $s^2$, the lower surface of the stone door T. The mold-shover $n$ is a double T-shaped mold-shover, provided with the lugs $f$ and the sheaves $y'$.

The operation of my machine is as follows: Brick-molds are placed upon the platform W and shoved under the pug-mill A until the first mold rests immediately under the press-box D. A sufficient number are placed upon the platform to extend from the front of the press-box D to the cross-bar $m$ of the mold-shover $n$, clay is thrown into the pug-mill A, and the machine is set in motion. In turning the shaft R the clay is thoroughly mixed and tempered by the tempering-knives radiating from the center shaft, R.

The bevel-wheel O, by means of the pinion N, shaft N', and crank M, and connecting-link I, sets the slide H in motion, which in its upward stroke, coming in contact with the top of movable frame J, raises the frame J and plunger K, and clay is shoved, by means of wipers radiating from the center shaft, R, through an opening in the side of the pug-mill A into the press-box D. Upon the downward stroke of the slide H it presses upon the adjustable slide L, which is held in position by the dog E, and the frame J and plunger K are forced down, which presses clay from the press-box D into a mold immediately under the press-box D. When the mold under the press-box D has been filled the mold-shover shoves an empty mold under the press-box and the filled mold is removed.

The pressure to which the clay is subjected is regulated by raising or lowering the slide L. The frame J and slide L are so constructed that the slide L may be dropped, so that no motion is communicated to the frame J during the entire stroke of the slide H; or the slide L may be raised, so that the entire stroke of the slide H will be transmitted to the frame J.

The slide L is usually adjusted so as to allow of some lost motion of the slide H. It is during this lost motion, while the frame J has no motion, and while the plunger K is resting upon the clay in the press-box, that the filled mold is shoved forward upon the platform W. This arrangement prevents the clay from being pumped out of the molds by the suction caused by the upward stroke of the plunger K.

The bottom of the plunger K is made with a convex surface, this shape causing the clay to flow into and fill the molds better than a plunger made with a flat bottom or a bottom of another shape. The plunger, when made with a convex bottom, releases itself more readily from the clay, and can be started on its upward stroke with less force than a bottom of another shape.

The mold-shover $n$ has a horizontal reciprocating motion, which is so adjusted that during the downward stroke of the plunger K the mold-shover $n$ is performing its backward stroke. This backward stroke of the mold-shover $n$ leaves an interval between the molds already placed upon the platform and the cross-bar of the mold-shover $n$. Into this interval another empty mold is placed, which, in its turn, is shoved under the press-box, filled, and removed.

If a stone large enough to extend above the side of a mold is forced through the grate of the press-box into the mold below, the mold-shover $n$, in shoving the mold forward, brings the stone in contact with the stone door, and the stone door is forced open. When the mold containing the stone has passed from under the stone door, the stone door is closed by means of the weights $e$, levers $t$, and links $h$.

The stone door not only rises with the hangers $r$, but it also revolves at the same time in bearings in the hangers $r$; but it may be made so as so rise with the hangers $r$, and not revolve.

The platform W may be raised or lowered by turning the screws $Z'$, which move the adjustable supports Y. That part of the platform W in front of the machine may be still more lowered by letting down the lever X, which lowers the arms V, upon which that part of the platform rests.

Having thus described my invention, what I claim as new, and desire to secure by Letters Patent, is—

1. The knee-shaped plunger K, having a bottom with cylindrical bulge in the middle of its lower surface, substantially as set forth.

2. The knee-shaped plunger K, having a bottom with a cylindrical bulge in the middle of its lower surface, in combination with the frame J, substantially as shown and described.

3. The plunger K, in combination with the sliding frame J, slide H, adjusting rack-slide L, spur-wheel F, and dog E, substantially as described.

4. The combination of the adjusting rack-slide L, dog E, and spur-wheel F, whereby the pressure of the plunger is regulated, as described.

5. The combination of the frame J, carrying plunger K, the adjusting rack-slide L, the spur-wheel F, and dog E, substantially as described.

6. The double T-shaped mold-shover $n$, provided with lugs $f$ at the ends of the cross-heads $c'$, in combination with the friction-rollers $y'$, adjustable cross-bar $m$, tracks $n^2$, and platform W, substantially as shown and described.

7. The frame J, slide H, slide L, spur-wheel F, and dog E, in combination, substantially as shown and described.

8. The double T-shaped mold-shover $n$, provided with the lugs $f$ at the ends of the cross-heads $c'$, friction-rollers $y'$, adjustable cross-bar $m$, in combination with the tracks $n^2$, platform W, segment-rack $y$, shaft $L'$ crank C, and pitman B, substantially as shown and described.

9. The stone door T, rods $e'$, lugs $d'$, links $h$, and lever $t$, in combination with the adjustable sliding weights $e$, substantially as shown and described.

10. The stone door T, made so as to rotate on its own axis in bearings at the lower ends of the hangers $r$, the hangers $r$, rods $e'$, lugs $d'$, links $h$, and levers $t$, in combination with the adjustable sliding weights $e$, substantially as shown and described.

11. The stone door T, having its lower surface, $s^1$, beveled, so as to form an acute angle with the outer surface, $s^2$, of the stone door T, in combination with the rods $e'$, lugs $d'$, hangers $r$, and press box D, substantially as set forth.

GAYLORD MARTIN.

Witnesses:
WM. T. LYNCH,
WM. H. MORRIS.